United States Patent
Higano et al.

(10) Patent No.: US 10,295,729 B2
(45) Date of Patent: May 21, 2019

(54) LIQUID CRYSTAL DISPLAY DEVICE

(71) Applicant: Japan Display Inc., Minato-ku (JP)

(72) Inventors: Emi Higano, Tokyo (JP); Toshiyuki Higano, Tokyo (JP); Shigesumi Araki, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 15/180,200

(22) Filed: Jun. 13, 2016

(65) Prior Publication Data

US 2017/0003528 A1    Jan. 5, 2017

(30) Foreign Application Priority Data

Jul. 3, 2015 (JP) ................. 2015-134299

(51) Int. Cl.
*F21V 8/00* (2006.01)
*G02F 1/1333* (2006.01)

(52) U.S. Cl.
CPC ......... *G02B 6/0068* (2013.01); *G02B 6/0083* (2013.01); *G02F 1/1333* (2013.01); *G02B 6/0051* (2013.01); *G02B 6/0053* (2013.01); *G02B 6/0055* (2013.01); *G02F 2001/133302* (2013.01); *G02F 2201/54* (2013.01); *G02F 2202/28* (2013.01)

(58) Field of Classification Search
CPC ............. G02F 1/1339; G02F 1/133345; G02F 1/133512; G02F 1/133514; G02F 1/1337; G02F 1/134336; G02F 1/13439; G02F 1/136286; G02F 2001/133519; G02F 2001/133738; G02F 2201/121; G02F 2201/123; G02F 2202/28; G02B 6/0068; G02B 6/0083; G02B 6/0051; G02B 6/0053; G02B 6/0055
See application file for complete search history.

(56) References Cited

U.S. PATENT DOCUMENTS

| | | | |
|---|---|---|---|
| 2006/0159867 A1* | 7/2006 | O'Donnell | B32B 37/12 428/1.5 |
| 2007/0164966 A1 | 7/2007 | Okita et al. | |
| 2014/0132894 A1* | 5/2014 | Lee | F21V 9/14 349/96 |
| 2015/0170582 A1* | 6/2015 | Shimizu | G02F 1/133308 345/206 |
| 2016/0341887 A1* | 11/2016 | Fang | G02B 6/0088 |

FOREIGN PATENT DOCUMENTS

| | | |
|---|---|---|
| JP | 2008-164860 | 7/2008 |
| JP | 2009-109873 | 5/2009 |

* cited by examiner

*Primary Examiner* — Nathanael R Briggs
(74) *Attorney, Agent, or Firm* — Oblon, McClelland, Maier & Neustadt, L.L.P.

(57) ABSTRACT

According to one embodiment, a liquid crystal display device includes a display device with a first main surface and a second main surface which is opposite to the first main surface, a first member disposed in the first main surface side of the display panel, a second member disposed between the first member and the display panel, and a cover member disposed in the second main surface side of the display panel, and having a rigidity greater than that of the display panel. The coefficient of thermal expansion of the second member is greater than that of the first member.

8 Claims, 7 Drawing Sheets

LIQUID CRYSTAL DISPLAY DEVICE

CROSS-REFERENCE TO RELATED APPLICATIONS

This application is based upon and claims the benefit of priority from Japanese Patent Application No. 2015-134299, filed Jul. 3, 2015, the entire contents of which are incorporated herein by reference.

FIELD

Embodiments described herein relate generally to a liquid crystal display device.

BACKGROUND

Liquid crystal display devices are used in many fields. Many such display devices include a display panel and optical elements such as optical films of various kinds, and sometimes, several optical elements having different coefficients of thermal expansion are disposed on the back of the display panel. In the technical field of such display devices, there is a technique of adhering an antiwarp layer to a light incident surface of a light diffusion layer to reduce warpage of optical sheets due to thermal expansion.

Here, at high temperature, a cell gap in the display panel becomes uneven by the expansion of liquid crystal molecules, and thereby, the display quality may deteriorate.

DETAILED DESCRIPTION

In general, according to one embodiment, provided is a liquid crystal display device including a display device with a first main surface and a second main surface which is opposite to the first main surface, a first member disposed in the first main surface side of the display panel, a second member disposed between the first member and the display panel, and a cover member disposed in the second main surface side of the display panel, and having a rigidity greater than that of the display panel, wherein a coefficient of thermal expansion of the second member is greater than that of the first member.

According to one embodiment, provided is a liquid crystal display device including a display panel with a first main surface and a second main surface opposite to the first main surface, a first member disposed in the first main surface side of the display panel, a second member disposed between the first member and the display panel, a third member disposed in the second main surface side of the display panel, and a fourth member disposed in the second main surface side of the display panel with the third member interposed therebetween, wherein a coefficient of thermal expansion of the second member is greater than that of the first member, and a coefficient of thermal expansion of the third member is greater than that of the fourth member.

Embodiments will be described hereinafter with reference to the accompanying drawings. Incidentally, the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc. of the respective parts are schematically illustrated in the drawings, compared to the actual modes. However, the schematic illustration is merely an example, and adds no restrictions to the interpretation of the invention. Besides, in the specification and drawings, the structural elements having functions, which are identical or similar to the functions of the structural elements described in connection with preceding drawings, are denoted by like reference numerals, and an overlapping detailed description is omitted unless otherwise necessary.

Figure 1A:
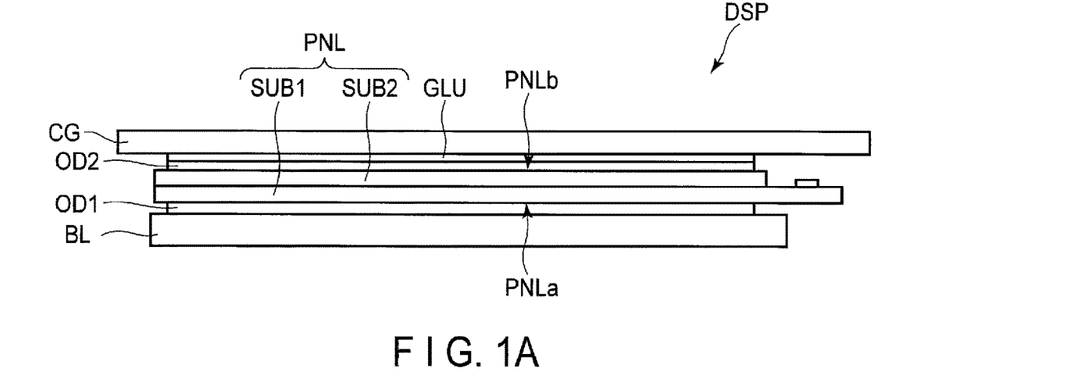
FIG. 1A is a cross-sectional view of a liquid crystal display device DSP of an embodiment.

FIG. 1A is a cross-sectional view showing a liquid crystal display device DSP of an embodiment. Display devices of this type are used in, for example, smartphones, tablet computers, mobile phones, personal computers, television receivers, in-car devices, and gaming devices.

The liquid crystal display device DSP includes, for example, a display panel PNL, first optical film OD1, second optical film OD2, backlight unit BL for the illumination of the display panel PNL, and cover member CG.

The display panel PNL includes a first substrate SUB1, second substrate SUB2 opposed to the first substrate SUB1, and liquid crystal layer interposed between the first substrate SUB1 and the second substrate SUB2 (liquid crystal layer LQ which is described later). The display panel PNL includes a main surface in the first substrate SUB1 side (first main surface) PNLa and a main surface opposite to the main surface PNLa (second main surface) PNLb.

The display panel PNL is, for example, of transmissive type having a light transmission display function which displays an image by selectively pass the light from the backlight unit BL therethrough. Note that the display panel PNL may be of reflective type having a light reflection display function which displays an image by selectively reflecting the light from the display surface side such as external light and auxiliary light thereon. Alternatively, the display panel PNL may be of transflective type which includes both the light transmission display function and the light reflection display function.

The first optical film OD1 and the second optical film OD2 are disposed such that the display panel PNL is interposed therebetween. The first optical film OD1 is disposed in the main surface PNLa side of the display panel PNL. The second optical film OD2 is disposed in the main surface PNLb side of the display panel PNL. In this example, the first optical film OD1 is adhered to the first substrate SUB1 and the second optical film OD2 is adhered to the second substrate SUB2. The first optical film OD1 and the second optical film OD2 each include a polarizer, and may include other optical functional layers such as a phase difference plate and a view angle enlargement film, if necessary.

The backlight unit BL is disposed to be opposed to the main surface PNLa of the display panel PNL with the first optical film OD1 interposed therebetween. Various types of light units can be used as the backlight unit BL. The applicable light source is, for example, light emitting diode (LED) or cold cathode tube (CCFL). Detailed explanation of such a backlight unit is omitted. Note that, if the display panel PNL includes the light reflection display function alone, the backlight unit BL is not adopted.

The cover member CG is disposed in the main surface PNLb side of the display panel with the second optical film OD2 interposed therebetween. In this example, the cover member CG is adhered to the second optical film OD2 with an adhesive agent GLU.

Figure 1B:
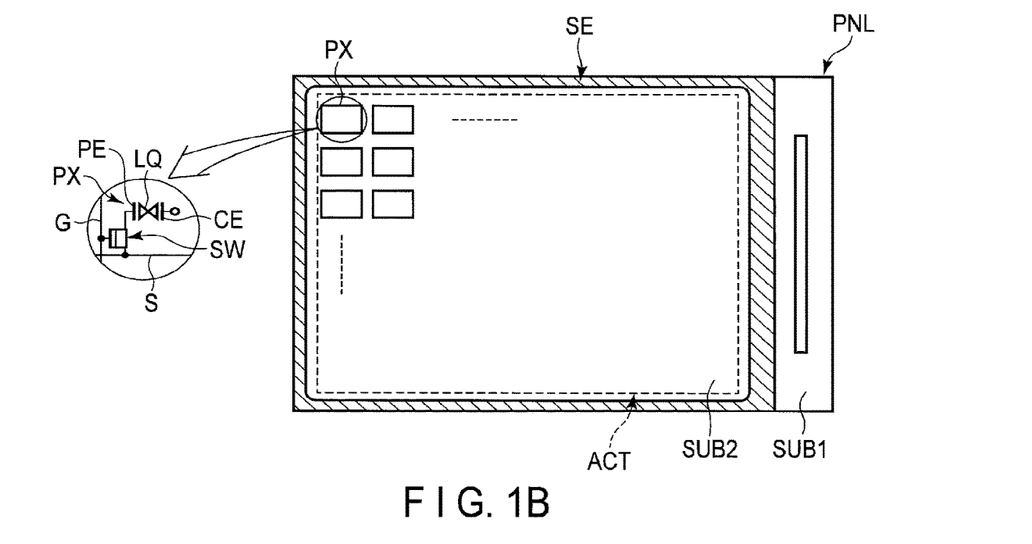
FIG. 1B is a plan view of the structure of a display panel PNL of the embodiment.

FIG. 1B is a plan view of the structure of the display panel PNL of the embodiment.

The first substrate SUB1 and the second substrate SUB2 are adhered together by a sealant SE with a certain cell gap formed therebetween. The liquid crystal layer LQ is held inside the sealant SE in the cell gap between the first substrate SUB1 and the second substrate SUB2. The display panel PNL includes an active area ACT by which an image is displayed inside the area surrounded by the sealant SE. The active area ACT is, for example, a substantial rectangle and is composed of a plurality of pixels PX arranged in a matrix. Note that the active area ACT may be a different polygonal shape and may have curved edges.

The first substrate SUB1 includes, in the active area ACT, a gate line G, source line S crossing the gate line G, switching element SW electrically connected to the gate line G and the source line S in each pixel PX, and pixel electrode PE electrically connected to the switching element SW in each pixel PX. The common electrode CE is disposed in at least the first substrate SUB1 or the second substrate SUB2.

The sealant SE is formed as a loop surrounding the active area ACT. In the example depicted, the sealant SE is formed as a rectangular loop.

The above display panel PNL is formed through the following process, for example.

Initially, the first substrate SUB1 and the second substrate SUB2 are prepared. A sealant is applied in a loop shape to either the first substrate SUB1 or the second substrate SUB2 using a dispenser or a screen print plate. In a vacuum, a liquid crystal material is dropped inside the area surrounded by the sealant. Then, the first substrate SUB1 and the second substrate SUB2 are matched and fit in a vacuum, and air is introduced into the vacuum such that the sealant is crushed by a differential pressure between the inside and the outside of the first substrate SUB1 and the second substrate SUB2, and the liquid crystal material spreads between the first substrate SUB1 and the second substrate Sub2. Thus, the liquid crystal layer LQ is formed in the cell gap. Then, the sealant is cured by, for example, irradiating ultraviolet to the sealant or heating the sealant.

Figure 2:
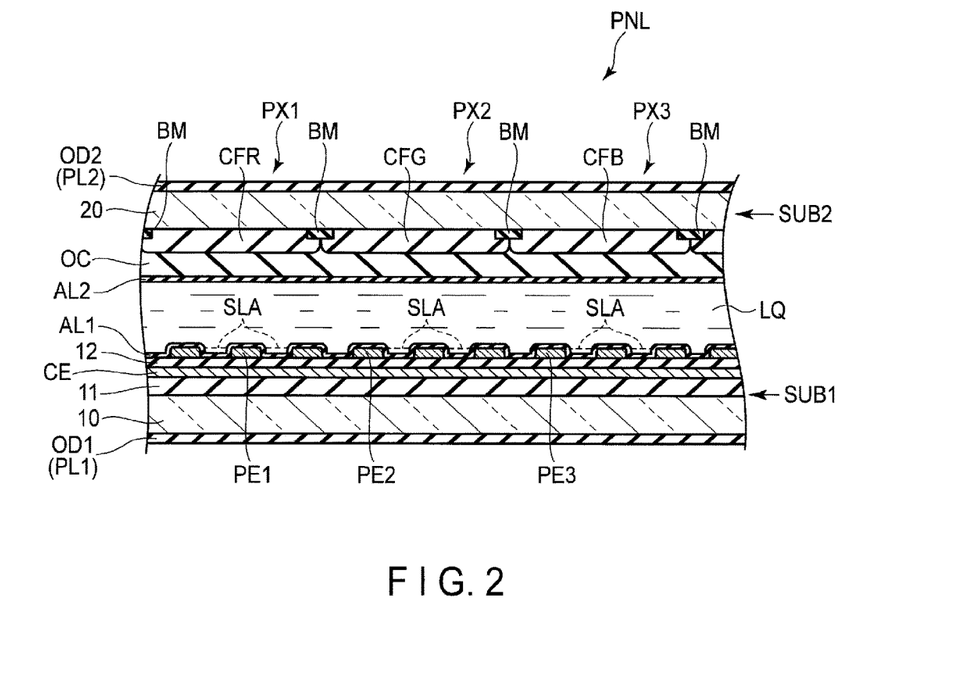
FIG. 2 is a cross-sectional partial view of the display panel PNL of FIG. 1.

FIG. 2 is a cross-sectional partial view of the display panel PNL of FIG. 1.

The first substrate SUB1 includes a transparent first insulating substrate 10 which is a glass substrate or a resin substrate. The first substrate SUB1 includes, on the first insulating substrate 10 in the side opposed to the second substrate SUB2, a common electrode CE, pixel electrodes PE1, PE2, and PE3, first insulating film 11, second insulating film 12, and first alignment film AL1, for example. The common electrode CE is formed on the first insulating film 11 and extends over the pixels PX1 to PX3. The second insulating film 12 covers the common electrode CE. Note that, although they are not depicted, elements including a gate line, source line, and switching element are formed between the first insulating substrate 10 and the first insulating film 11. Pixel electrode PE1 of pixel PX1, pixel electrode PE2 of pixel PX2, and pixel electrode PE3 of pixel PX3 are formed on the second insulating film 12 to be opposed to the common electrode CE. The pixel electrodes PE1 to PE3 each have a slit SLA to be opposed to the common electrode CE. The pixel electrodes PE1 to PE3 are covered with the first alignment film AL1. The common electrode CE and the pixel electrodes PE1 to PE3 are formed of a transparent conductive material such as indium tin oxide or indium zinc oxide.

The second substrate SUB2 is formed of a transparent second insulating substrate 20 such as a glass substrate or a resin substrate. The second substrate SUB2 includes, on the second insulating substrate 20 in the side opposed to the first substrate SUB1, a light shielding layer BM, color filters CFR, CFG, and CFB, overcoat layer OC, and second alignment film AL2, for example. The light shielding layer BM is formed on the inner surface of the second insulating substrate 20 to be opposed to the first substrate SUB1. The light shielding layer BM is formed of a black resin material or a light shielding metal material. Color filters CFR, CFG, and CFB are formed on the inner surface of the second insulating substrate 20 and partly overlap the light shielding layer BM. Color filters CFR, CFG, and CFB are opposed to the pixel electrodes PE1 to PE3, respectively, with the liquid crystal layer LQ interposed therebetween. Color filter CFR is a red filter formed of a red resin material. Color filter CFG is a green filter formed of a green resin material. Color filter CFB is a blue filter formed of a blue resin material. The overcoat layer covers color filters CFR, CFG, and CFB. The overcoat layer OC is formed of a transparent resin material. The overcoat layer OC is covered with the second alignment film AL2. The first alignment film AL1 and the second alignment film AL2 are formed of a material exerting horizontal alignment.

The first substrate SUB1 and the second substrate SUB2 are attached with a certain cell gap formed therebetween. The liquid crystal layer LQ is sealed in between the first alignment film AL1 and the second alignment film AL2.

The first optical film OD1 including a first polarizer PL1 is disposed on the outer surface of the first substrate SUB1. The second optical film OD2 including a second polarizer PL2 is disposed on the outer surface of the first substrate SUB1.

Note that, although color filters CFR, CFG, and CFB are formed on the second substrate SUB2, they may be formed on the first substrate SUB1 instead. In some cases, color filters CFR, CFG, and CFB may replace the first insulating film 11, or may be disposed between the first insulating substrate 10 and the first insulating film 11.

Note that, in the example of FIG. 2, the display panel PNL includes pixel electrodes PE1 to PE3 and the common electrode CE on the first substrate SUB1; however, no limitation is intended thereby. Various structures can be adopted arbitrarily depending on the display mode of the display panel PNL.

Detailed description of the display panel PNL is omitted. Note that, in a display mode using a vertical field along the normal of the substrate main surface or in a display mode using an inclined field with respect to the substrate main surface, the pixel electrode PE is disposed in the first substrate SUB1 while the common electrode CE is disposed on the second substrate SUB2. Furthermore, in a display mode using a lateral field along the substrate main surface, both the pixel electrode PE and the common electrode CE are disposed on the first substrate SUB1. Alternatively, the display panel PNL may be structured to correspond to a display mode in which the above vertical, lateral, and inclined fields are arbitrarily combined.

Figure 3:
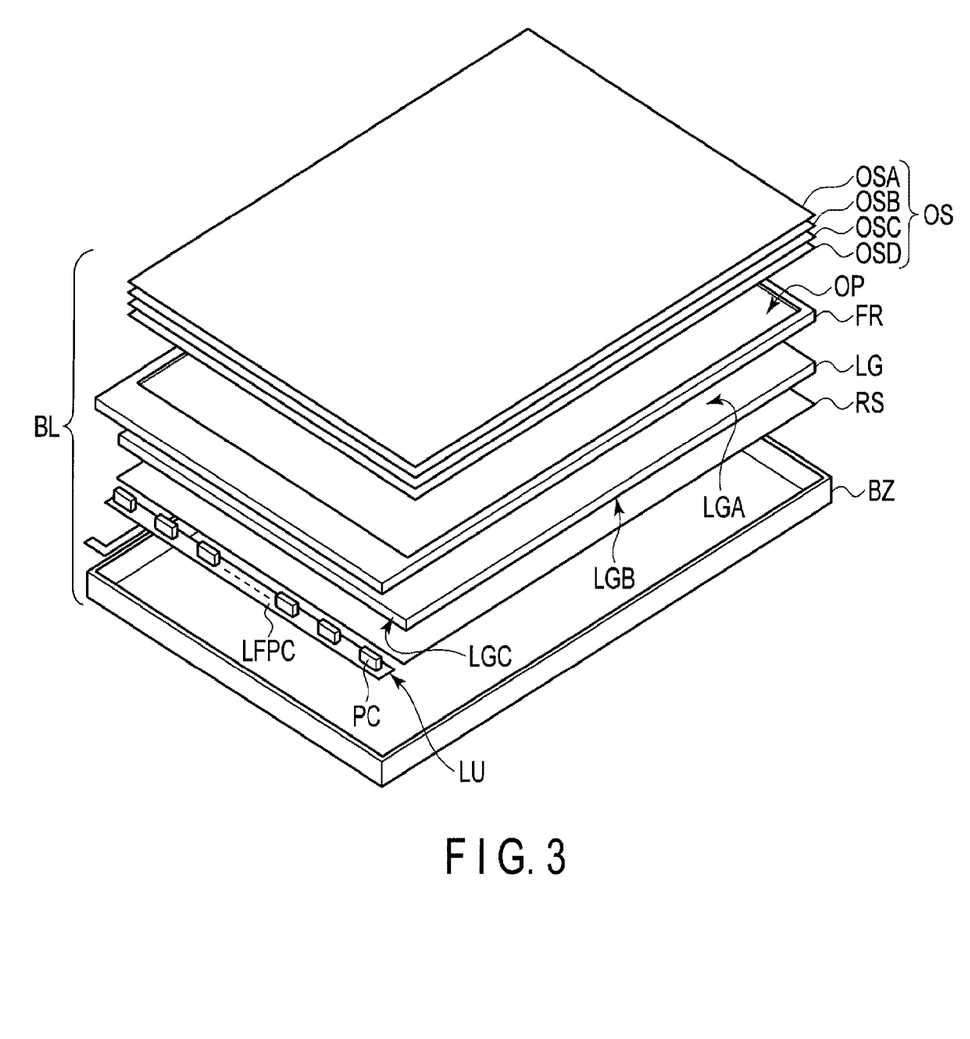
FIG. 3 is a perspective view of the detailed structure of a backlight unit BL of the display panel PNL of FIG. 1 in a disassembled manner.

FIG. 3 is a perspective view of the detailed structure of the backlight unit of FIG. 1 in a disassembled manner.

In the example depicted, the backlight unit BL includes an optical sheet OS, frame FR, lightguide plate LG, light source unit LU, reflective sheet RS, and bezel BZ.

The optical sheet OS is light transmissive. The backlight unit BL includes, for example, a diffusion sheet OSA, prism sheet OSB, prism sheet OSC, and diffusion sheet OSD stacked in layers as the optical sheet OS.

The frame FR is accommodated in the bezel BZ. The frame FR is a rectangular frame which has a rectangular opening OP. The optical sheet OS is disposed inside the opening OP of the frame FR.

The lightguide plate LG is disposed between the frame FR and the bezel BZ. The lightguide plate LG is formed as a flat plate. The lightguide plate LG includes a main surface LGA opposed to the frame FR, main surface LGB which is opposite to the main surface LGA, and side surface LGC connecting the main surfaces LGA and LGB.

The light source unit LU is disposed along the side surface LGC of the lightguide plate LG. The light source unit LU includes, for example, a plurality of light emitting diodes LED and a flexible printed circuit LFPC on which the light emitting diodes LED are mounted. In this example, the light emitting diodes LED are disposed along the side surface PGC parallel to a short side of the lightguide plate LG; however, the light emitting diodes LED may be disposed along the side surface parallel to a long side of the lightguide plate LG.

The reflective sheet RS is light reflective and is disposed between the lightguide plate LG and the bezel BZ. In the example depicted, the reflective sheet RS is formed as a rectangle and is opposed to the main surface LGB.

Figure 4:
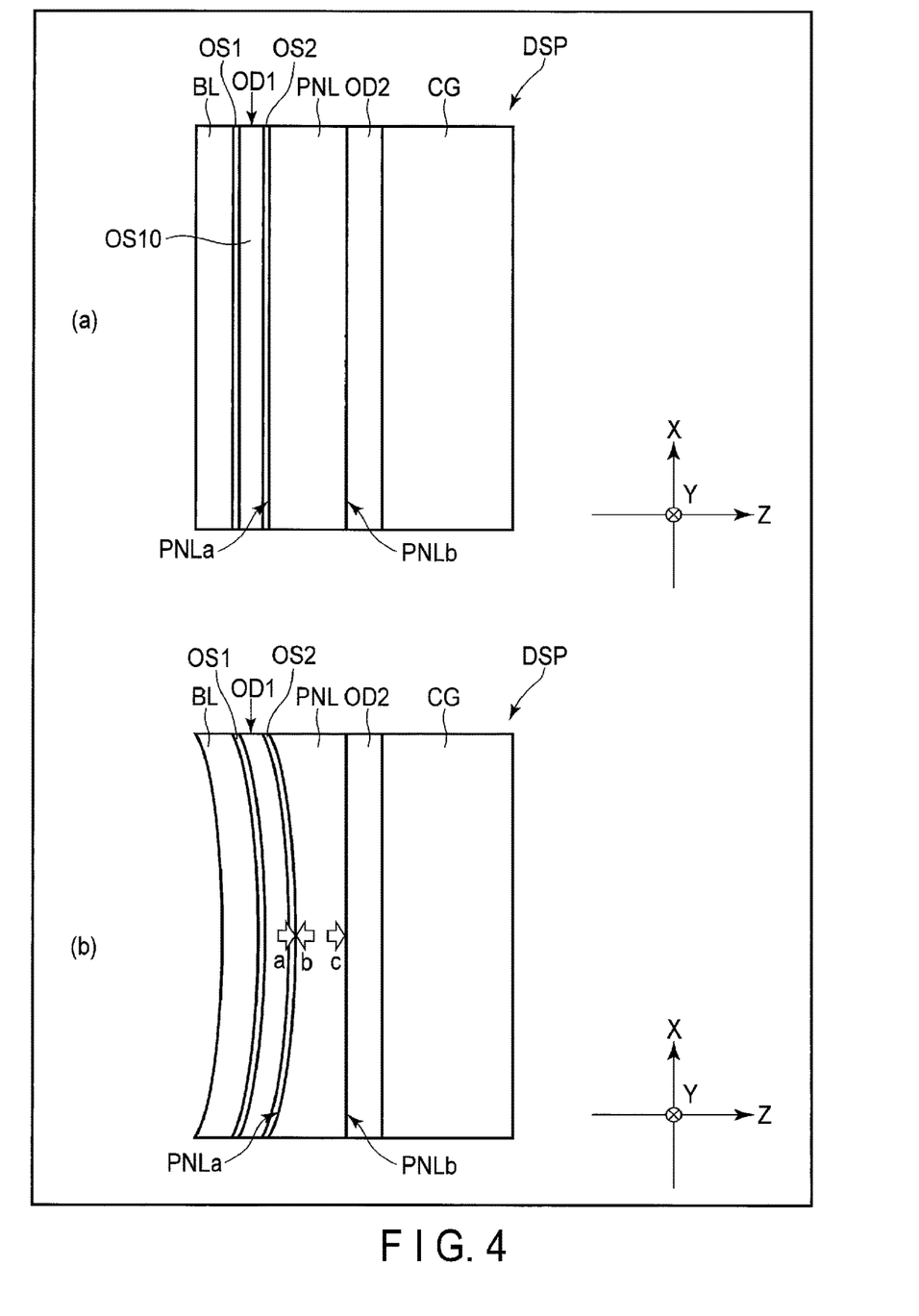
FIG. 4 is a side view of the liquid crystal display device DSP.

FIG. 4 is a side view of the liquid crystal display device DSP. FIG. 4(a) is a schematic view of the liquid crystal display device DSP of FIG. 1.

The liquid crystal display device DSP further includes a first member OS1 and a second member OS2. The first member OS1 and the second member OS2 are disposed in the main surface PNLa side of the display panel PNL. The second member OS2 is disposed between the first member OS1 and the display panel PNL. The backlight unit BL is opposed to the first member OS1 in the side opposite to the second member OS2. In the example depicted, the first member OS1 contacts the backlight unit BL and the second member OS2 contacts the display panel PNL.

The first member OS1 and the second member OS2 are formed of different materials. Furthermore, the first member OS1 and the second member OS2 have different coefficients of thermal expansion. The first member OS1 has a coefficient of thermal expansion $\eta 1$, and the second member OS2 has a coefficient of thermal expansion $\eta 2$. In this example, the coefficient of thermal expansion $\eta 2$ of the second member OS2 is set to be greater than the coefficient of thermal expansion $\eta 1$ of the first member OS1. Note that coefficients of thermal expansion $\eta 1$ and $\eta 2$ are either negative or positive. If both coefficients of thermal expansion $\eta 1$ and $\eta 2$ are positive, the first member OS1 and the second member OS2 expand corresponding to a rise of temperature. If both coefficients of thermal expansion $\eta 1$ and $\eta 2$ are negative, the first member OS1 and the second member OS2 thermal contract or negatively expand corresponding to a rise of temperature.

The first member OS1 is, for example, a film included in the first optical film OD1 and is adhered to the backlight unit BL. Alternatively, the first member OS1 is an adhesive agent which adheres the first optical film OD1 and the backlight unit BL. The second member OS2 is, for example, a film included in the first optical film OD1 and is adhered to the display panel PNL. Alternatively, the second member OS2 is an adhesive agent which adheres the first optical film OD1 and the display panel PNL.

Hereinafter, an example of the first member OS1 and the second member OS2 will be explained. In this example, the first optical film OD1 is used as the first polarizer PL1. If the first member OS1 and the second member OS2 both function as supports of the first polarizer PL1, an intermediate layer OS10 is disposed between the first member OS1 and the second member OS2 as a polarizing layer. The first polarizer PL1 is formed as a combination of the first member OS1 and the intermediate layer OS10 adhered together, or a combination of the intermediate layer OS10 and the second member OS2 adhered together. The first member OS1 and the second member OS2 are formed of, for example, triacetylcellulose (TAC) and cycloolefin polymer (COP), and the intermediate layer OS10 is formed of, for example, polyvinyl alcohol (PVA). Note that the first member OS1 and the second member OS2 may be directly adhered together, and in that case, one of the first member OS1 and the second member OS2 functions as a support of the first polarizer PL1 and the other functions as a polarizing layer of the first polarizer PL1. Note that, if the intermediate layer OS10 in the figure corresponds to the first polarizer PL1, the first member OS1 is an adhesive agent which adheres the first polarizer PL1 to the backlight unit BL and the second member OS2 is an adhesive agent which adheres the first polarizer PL1 to the display panel PNL.

Furthermore, the first optical film OD1 may include an optical function layer such as a phase differential plate in addition to the first polarizer PL1. In that case, at least one of the first member OS1 and the second member OS2 is an optical functional layer or an adhesive layer to adhere an optical functional layer.

The cover member CG is disposed in the main surface PNLb side of the display panel PNL. The rigidity of the cover member CG is greater than that of the display panel PNL. The cover member CG is formed of, for example, a tempered glass, or a reinforced plastic. Thus, the display panel PNL is fixed firmly by the cover member CG and the deformation of the display panel PNL is suppressed in the cover member CG side. On the other hand, the display panel PNL is much flexible in the side opposed to the backlight unit BL and the display panel PNL is desirably deformable therein.

FIG. 4(b) shows the liquid crystal display device DSP of FIG. 4(a) in a high temperature condition. Here, the liquid crystal display device DSP is placed in a temperature of 70° C., for example. Note that, in the present embodiment, the thickness of the display panel PNL (between the first main surface PNLa and the second main surface PNLb) is 0.65 mm or less, and the display panel PNL is much deformable than the cover member CG. The thickness of the display panel PNL may be set to 0.25 mm or less.

The coefficient of thermal expansion $\eta 2$ of the second member OS2 is greater than the coefficient of thermal expansion $\eta 1$ of the first member OS1, and thus, the thermal expansion of the second member OS2 becomes greater than that of the first member OS1 in a high temperature condition. Note that the thermal expansion here includes negative expansion. That is, if both the first member OS1 and the second member OS2 negatively expand (thermal contraction), the negative expansion of the first member OS1 becomes greater than that of the second member OS2. As a result of the expansion or the negative expansion, force a which presses the display panel PNL from the main surface PNLa side is produced.

On the other hand, in the display panel PNL in a high temperature condition, the liquid crystal layer expands and force b and force c are produced to enlarge the cell gap between the first substrate SUB1 and the second substrate SUB2. Forces a and b in the figure are mutually reactive. Note that forces a to c include not only vector of the third direction Z but also vectors of other directions.

In this embodiment, the first member OS2 expands greater than the second member OS1 in a high temperature condition. Or, the negative expansion of the first member OS1 becomes greater than the second member OS2, and force a pressing the display panel PNL from the main surface PNLa side is produced. Force a is a reaction to force b which is produced by the expansion of the liquid crystal layer, and the expansion of the display panel PNL toward the main surface PNLa side can be suppressed.

Furthermore, the display panel PNL is supported in the main surface PNLb side by the cover member CG rigidity of which is greater than that of the display panel PNL. Thus, even if force c is produced by the expansion of the liquid crystal layer, the expansion of the display panel PNL toward the main surface PNLb side can be suppressed. The above advantage is achieved when the thickness of the display panel PNL is 0.65 mm or less.

As can be understood from the above, the expansion of the display panel PNL toward both the main surface PNLa side and the main surface PNLb side can be suppressed, and thus, unevenness in display caused by an uneven cell gap can be suppressed. Therefore, the liquid crystal display device which can suppress deterioration of display quality can be achieved.

Moreover, if the liquid crystal layer of the display panel PNL is formed through a droplet injection method, a margin of the amount of droplet of the liquid crystal material during its manufacturing process is limited. That is, if the amount of droplet is too small, a cell gap cannot conform to the contraction of the liquid crystal layer in a low temperature condition, and air bubbles may possibly be generated therein. On the other hand, if the amount of droplet is too much, a cell gap cannot conform to the expansion of the liquid crystal layer in a high temperature condition, and unevenness of display may possibly be caused by partial expansion of the cell gap. In this embodiment, the expansion of the liquid crystal layer in a high temperature can be suppressed, and thus, the upper limit of the margin of the amount of droplet of the liquid crystal material during its manufacturing process can be raised.

Now, a variation of the embodiment will be explained.

Figure 5:
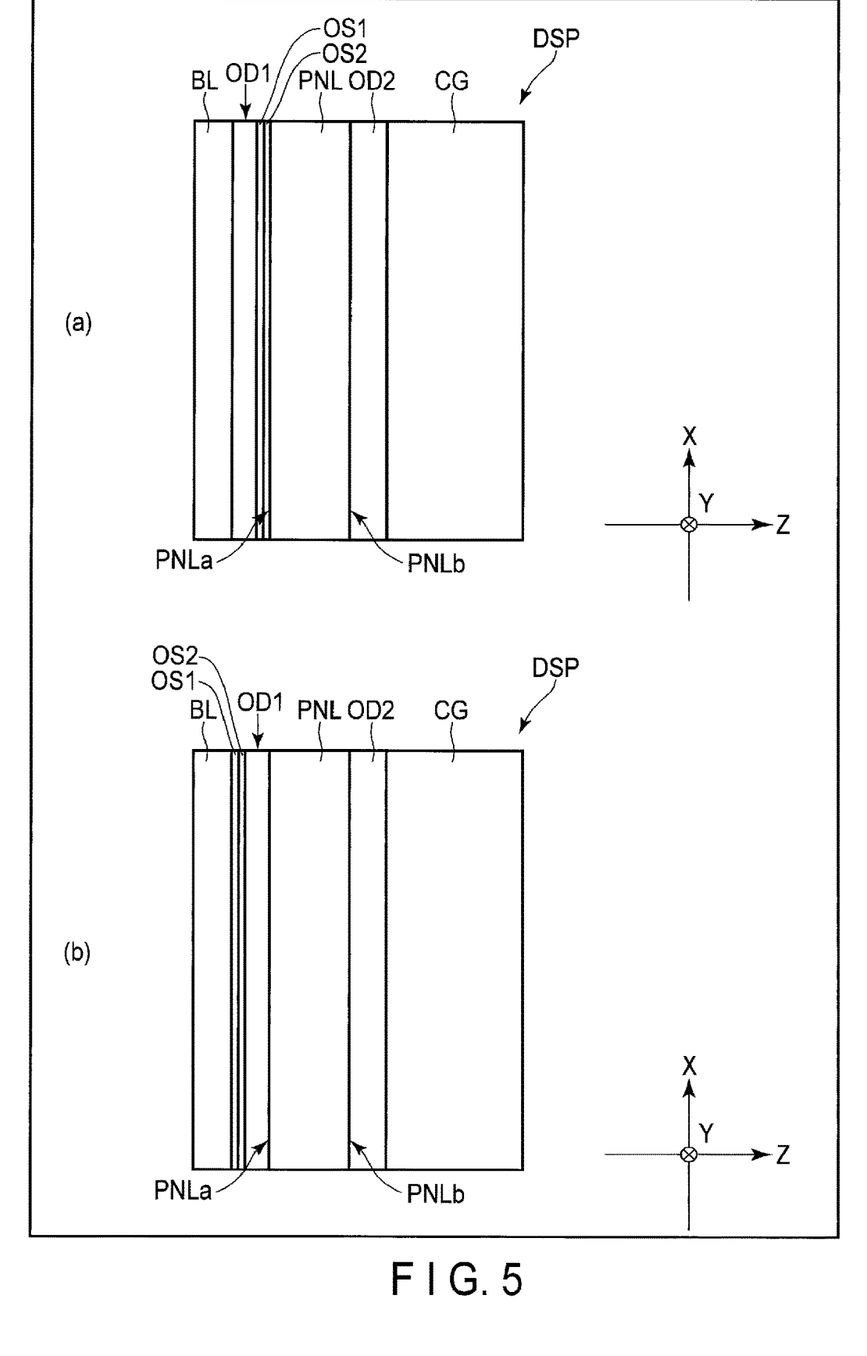
FIG. 5 shows another example of the embodiment.

FIG. 5 shows another example of the embodiment.

In comparison with the structure of FIG. 4(a), the position of the first member OS1 is different in the structure of FIG. 5(a). The first member OS1 is disposed to contact the second member OS2. The second member OS2 is disposed to contact the main surface PNLa of the display panel PNL. That is, the first member OS1 and the second member OS2 are disposed continuously on the main surface PNLa of the display panel PNL. IF the first member OS1 and the second member OS2 are both films, they are adhered to each other. Or, either one of the first member OS1 and the second member OS2 may be a film and the other may be an adhesive agent.

Now, another example of the first member OS1 and the second member OS2 will be explained. In this example, the first optical film OD1 is used as the first polarizer PL1. If the second member OS2 functions as a support of the first polarizer PL1 and the first member OS1 functions as a polarizing layer of the first polarizer PL1, the first member OS1 and the second member OS2 are directly adhered together. Alternatively, the first member OS1 may function as a support of the first polarizer PL1, and the second member OS2 may be an adhesive agent which adheres the first polarizer PL1 and the display panel PNL.

In comparison with the structure of FIG. 4(a), the position of the second member OS2 is different in the structure of FIG. 5(b). The second member OS2 is disposed to contact the first member OS1. The first member OS1 is disposed to contact the backlight unit BL. That is, the first member OS1 and the second member OS2 are disposed continuously on the surface of the backlight unit BL to be opposed to the display panel PNL. If the first member OS1 and the second member OS2 are both films, they are adhered to each other. Or, either one of the first member OS1 and the second member OS2 may be a film and the other may be an adhesive agent.

Now, another example of the first member OS1 and the second member OS2 will be explained. In this example, the first optical film OD1 is used as the first polarizer PL1. If the second member OS2 functions as a support of the first polarizer PL1 and the second member OS2 functions as the polarizing layer of the first polarizer PL1, the first member OS1 and the second member OS2 are directly adhered together. Alternatively, the second member OS2 may function as a support of the first polarizer PL1 and the first member OS1 may be an adhesive agent which adheres the first polarizer PL1 and the backlight unit BL.

Figure 6:
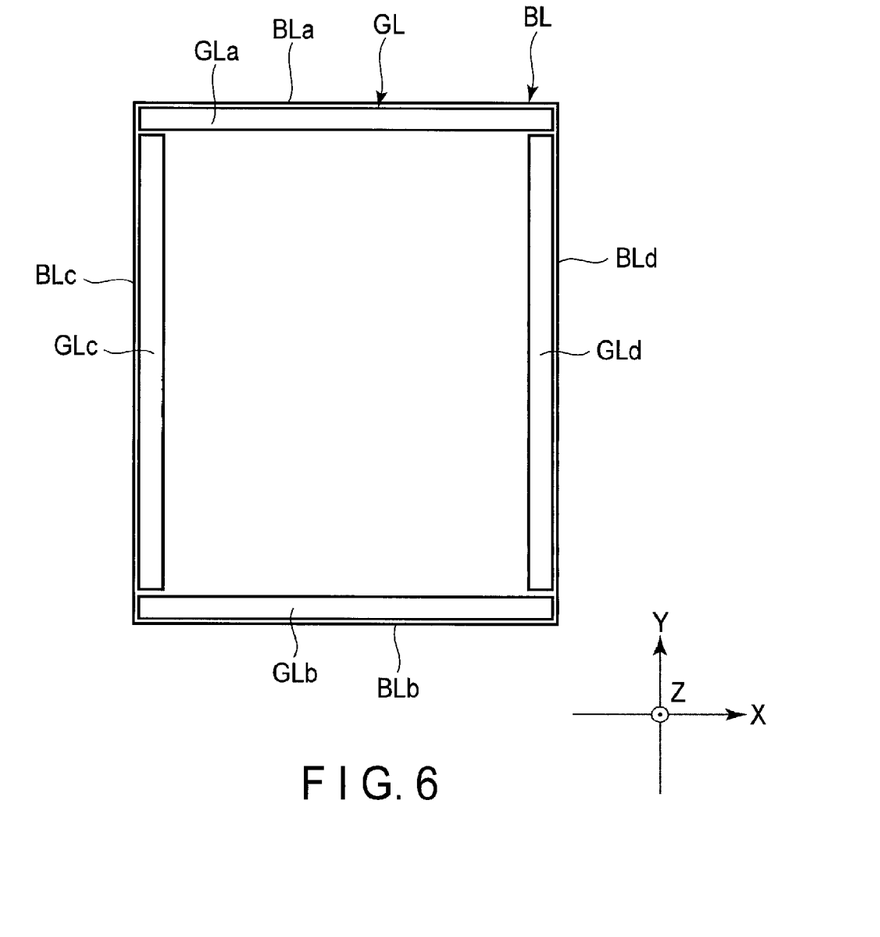
FIG. 6 shows an example of the layout of an adhesive agent GL of the backlight unit BL.

FIG. 6 shows an example of the layout of an adhesive agent GL of the backlight unit BL. The adhesive agent GL affixes the first substrate SUB1 of FIG. 1 to the frame FR of FIG. 3. In other words, the adhesive agent GL affixes the display panel and the backlight unit BL to one another. The adhesive agent GL may be, for example, a double-faced tape TP or a sticking agent used for detachable attachment.

The adhesive agent GL is applied along four edges BLa, BLb, BLc, and BLd of the backlight unit BL. A first application part GLa is applied to the edge BLa of the backlight unit BL extending in the first direction. A second application part GLb is applied to the edge BLb of the backlight unit BL in the first direction X. The third application part GLc is applied to the edge BLc of the backlight unit BL extending in the second direction Y. The fourth application part GLd is applied to the edge BLd of the backlight unit BL in the second direction Y.

For example, the adhesive agent GL corresponds to the first member OS1 of FIG. 4 and has a coefficient of thermal expansion η1. Here, a difference between the coefficient of thermal expansion η1 of the adhesive agent GL and the coefficient of thermal expansion η2 of the second member OS2 produces force a of FIG. 4(b), and the expansion of the display panel PNL can be suppressed. Note that this is not peculiar to the second member OS2, and a difference between the coefficient of thermal expansion of the adhesive agent and the coefficient of thermal expansion of another member produces reactive force a with respect to force b applied to the display panel PNL.

Furthermore, the coefficient of thermal expansion of each of the first to fourth application parts may vary. For example, a material having a first coefficient of thermal expansion may be used for the first application part GLa and the second application part GLb which extend in the first direction X, and a material having a second coefficient of thermal expansion may be used for the third application part GLc and the fourth application part GLd which extend in the second direction Y. Here, a difference between the first coefficient of thermal expansion and the second coefficient of thermal expansion can be used for adjustment of the thermal expansion of the adhesive agent GL in each of the first direction X and the second direction Y.

Note that, in the example depicted, the adhesive agent GL is separately applied to be along four edges of the backlight unit BL; however, no limitation is intended thereby. The first to fourth application parts may be applied thereto continuously.

Figure 7:
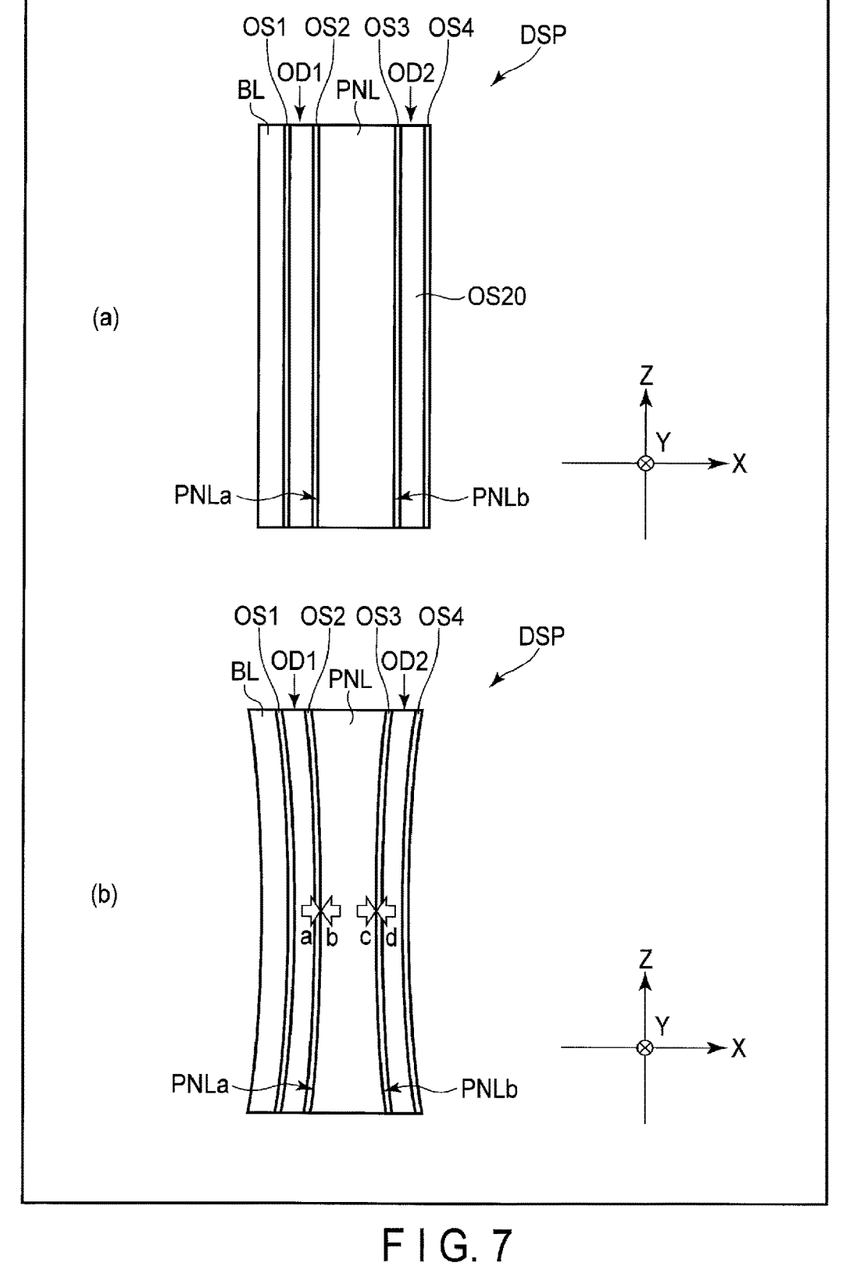
FIG. 7 shows another example of the embodiment.

FIG. 7 shows another example of the embodiment.

In comparison with the structure of FIG. 4(a), a third member OS3 and a fourth member OS4 are disposed in the main surface PNLb side of the display panel PNL in the structure of FIG. 7(a).

The third member OS3 is disposed in the main surface PNLb side of the display panel PNL. The fourth member OS4 is disposed in the main surface PNLb side of the display panel PNL with the third member OS3 interposed therebetween. In the example depicted, the third member OS3 contacts the main surface PNLb of the display panel PNL. Note that the third member OS3 may be adhered to the main surface PNLb of the display panel PNL. In the example of FIG. 7, the thickness of the display panel PNL is 0.25 mm, and accordingly, the other structural members such as the first substrate SUB1 and the second substrate SUB2 are formed thinner as compared to the case where the thickness of the display panel PNL is thicker, and thus, the expansion of the liquid crystal layer becomes greater. This also applies to the case of FIG. 4. Note that, in the example of FIG. 7, the thickness of the display panel PNL is maintained at 0.65 mm or less. Or, the thickness may be set to 0.25 mm or less. The third member OS3 and the fourth member OS4 are formed of different materials. Furthermore, the third member OS3 and the fourth member OS4 have different coefficients of thermal expansion. The third member OS3 has a coefficient of thermal expansion η3, and the fourth member OS4 has a coefficient of thermal expansion η4. In this example, the coefficient of thermal expansion η3 of the third member OS3 is set to be greater than the coefficient of thermal expansion η4 of the fourth member OS1. Note that coefficients of thermal expansion η3 and η4 are either negative or positive, as with coefficients of thermal expansion η1 and η2.

The third member OS3 is, for example, a film included in the second optical film OD2 and is adhered to the display panel PNL. Alternatively, the third member OS3 is an adhesive agent which affixes the second optical film OD2 and the display panel PNL. The fourth member OS4 is, for example, a film included in the second optical film OD2.

Now, an example of the third member OS3 and the fourth member OS4 will be explained. In this example, the second optical film OD2 is a second polarizer PL2. If the third member OS3 and the fourth member OS4 both function as supports of the second polarizer PL2, an intermediate layer OS20 is disposed between the third member OS3 and the fourth member OS4 as a polarizing layer. The second polarizer PL2 is formed as a combination of the third member OS3 and the intermediate layer OS20 adhered together, or a combination of the intermediate layer OS20 and the fourth member OS4 adhered together. Note that the third member OS3 and the fourth member OS4 may be directly adhered together, and in that case, one of the third member OS3 and the fourth member OS4 functions as a support of the second polarizer PL2 and the other functions as a polarizing layer of the second polarizer PL2. Note that, if the intermediate layer OS20 in the figure corresponds to the second polarizer PL2, the third member OS3 is an adhesive agent which affixes the second polarizer PL2 to the display panel PNL.

Furthermore, the second optical film OD2 may include an optical function layer such as a phase differential plate in addition to the second polarizer PL2. In that case, at least one of the third member OS3 and the fourth member OS4 is an optical functional layer or an adhesive layer to affix an optical functional layer.

FIG. 7(b) shows the liquid crystal display device DSP of FIG. 7(a) in a high temperature condition. Here, the liquid crystal display device DSP is placed in a temperature of 70° C., for example. Note that the display panel PNL in its main surface PNLa side is structured the same as in the above embodiment and the detailed explanation is omitted here.

The coefficient of thermal expansion η3 of the third member OS3 is greater than the coefficient of thermal expansion η4 of the fourth member OS4, and thus, the thermal expansion of the second member OS3 becomes greater than that of the fourth member OS4 in a high temperature condition. Note that the thermal expansion here includes negative expansion. That is, if both the third member OS3 and the fourth member OS4 negatively expand (thermal contraction), the negative expansion of the third member OS3 becomes greater than that of the fourth member OS4. As a result of the expansion or the negative expansion, force d which presses the display panel PNL from the main surface PNLa side is produced.

On the other hand, in the display panel PNL in a high temperature condition, the liquid crystal layer expands and force b and force c are produced to enlarge the cell gap between the first substrate SUB1 and the second substrate SUB2. Forces c and d in the figure are mutually reactive. Note that force d includes not only vector of the third direction Z but also vectors of other directions.

In this embodiment, the third member OS3 expands greater than the fourth member OS4 in a high temperature condition. Or, the negative expansion of the third member OS3 becomes greater than the fourth member OS4, and force d pressing the display panel PNL from the main surface PNLb side is produced. Force d is a reaction to force c which is produced by the expansion of the liquid crystal layer, and the expansion of the display panel PNL toward the main surface PNLb side can be suppressed.

As can be understood from the above, the expansion of the display panel PNL toward both the main surface PNLa side and the main surface PNLb side can be suppressed, and therefore, the same advantage as in the above embodiment can be achieved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device comprising:
   a display panel including a first main surface and a second main surface opposite to the first main surface;

a first member disposed in the first main surface side of the display panel;
a second member disposed between the first member and the display panel;
a backlight unit disposed in the first main surface side of the display panel; and
a cover member disposed in the second main surface side of the display panel, the cover member having a rigidity greater than that of the display panel, wherein
a coefficient of thermal expansion of the second member is greater than that of the first member,
the first member and the second member, due to the second member having a coefficient of thermal expansion greater than that of the first member, are deformed at a temperature of 70° C. so as to press the display panel at a temperature of 70° C.,
a deformation of the cover member is less than deformations of the first member and the second member at a temperature of 70° C.,
the second member and the cover member press the display panel so as to reduce a cell gap of the display panel at a temperature of 70° C.,
the first member and the second member are not disposed in the second main surface side of the display panel, and
the backlight unit is deformed at a temperature of 70° C. so as to press the display panel at a temperature of 70° C.

2. The liquid crystal display device of claim 1, wherein the first member is a film or an adhesive agent adhered to the backlight unit.

3. The liquid crystal display device of claim 1, wherein the second member is a film or an adhesive agent adhered to the display panel.

4. The liquid crystal display device of claim 2, further comprising a first polarizing layer between the first member and the second member, wherein
the first polarizing layer is deformed so as to press the display panel.

5. The liquid crystal display device of claim 1, wherein the first member and the second member are adhered to each other.

6. The liquid crystal display device of claim 1, wherein a gap between the first main surface and the second main surface of the display panel is 0.65 mm or less.

7. The liquid crystal display device of claim 1, wherein a gap between the first main surface and the second main surface of the display panel is 0.25 mm or less.

8. The liquid crystal display device of claim 1, wherein the first member and the second member are disposed between the display panel and the backlight unit,
the first member is in contact with the backlight unit, and
the second member is in contact with the display panel.

* * * * *